US012472680B2

(12) United States Patent
Byun et al.

(10) Patent No.: US 12,472,680 B2
(45) Date of Patent: Nov. 18, 2025

(54) ADDITIVE MANUFACTURING SYSTEM AND ADDITIVE MANUFACTURING METHOD

(71) Applicant: ENJET CO. LTD., Suwon-si (KR)

(72) Inventors: Do Young Byun, Seoul (KR); Vu Dat Nguyen, Suwon-si (KR); Hyung Dong Lee, Suwon-si (KR)

(73) Assignee: Enjet Co. Ltd., Suwon-si (KR)

( * ) Notice: Subject to any disclaimer, the term of this patent is extended or adjusted under 35 U.S.C. 154(b) by 325 days.

(21) Appl. No.: 18/181,676

(22) Filed: Mar. 10, 2023

(65) Prior Publication Data

US 2023/0302718 A1    Sep. 28, 2023

(30) Foreign Application Priority Data

Mar. 10, 2022  (KR) .................. 10-2022-0030264
Jun. 14, 2022   (KR) .................. 10-2022-0072075

(51) Int. Cl.
| | | |
|---|---|---|
| B29C 64/112 | (2017.01) | |
| B29C 64/188 | (2017.01) | |
| B29C 64/209 | (2017.01) | |
| B29C 64/245 | (2017.01) | |
| B29C 64/393 | (2017.01) | |
| B33Y 10/00 | (2015.01) | |
| B33Y 30/00 | (2015.01) | |
| B33Y 50/02 | (2015.01) | |

(52) U.S. Cl.
CPC .......... *B29C 64/112* (2017.08); *B29C 64/188* (2017.08); *B29C 64/209* (2017.08); *B29C 64/245* (2017.08); *B29C 64/393* (2017.08); *B33Y 30/00* (2014.12); *B33Y 50/02* (2014.12); *B33Y 10/00* (2014.12)

(58) Field of Classification Search
CPC ... B29C 64/112; B29C 64/218; B29C 64/188; B41J 2/06
See application file for complete search history.

(56) References Cited

U.S. PATENT DOCUMENTS

2017/0173945 A1* 6/2017 Byun .................. B41J 2/14032
2017/0197360 A1* 7/2017 Batchelder ............ B33Y 50/02
(Continued)

FOREIGN PATENT DOCUMENTS

| JP | 2018-86737 A | 6/2018 |
|---|---|---|
| KR | 10-2018-0084916 A | 7/2018 |
| KR | 10-2022-0001500 A | 1/2022 |

OTHER PUBLICATIONS

Office Action dated Aug. 29, 2024 in Korean Application No. 10-2022-0072075.

*Primary Examiner* — John J DeRusso
(74) *Attorney, Agent, or Firm* — SALIWANCHIK, LLOYD & EISENSCHENK

(57) ABSTRACT

The invention relates to an additive manufacturing system and additive manufacturing method comprising a printing platform that sprays a droplet and that deposits the droplet on a substrate or a build platform by attractive-force control of an electric field to form at least one layer of a laminated body in a layer by layer method; a flattening unit that flattens the laminated body formed by the printing platform to a preset height; a curing unit that cures the laminated body flattened by the flattening unit; and a controller that controls the printing platform, the flattening unit and the curing unit.

19 Claims, 21 Drawing Sheets

(56) References Cited

U.S. PATENT DOCUMENTS

| | | | |
|---|---|---|---|
| 2018/0370141 A1* | 12/2018 | Eller | B29C 64/291 |
| 2020/0189280 A1* | 6/2020 | Byun | B41J 2/14314 |
| 2023/0271248 A1* | 8/2023 | Myrick | B29C 64/165 |

* cited by examiner (a)

(b)

(c)

ADDITIVE MANUFACTURING SYSTEM AND ADDITIVE MANUFACTURING METHOD

CROSS-REFERENCE TO RELATED APPLICATIONS

This application claims the benefit of Korean Application Nos. 10-2022-0030264, filed Mar. 10, 2022; and 10-2022-0072075, filed Jun. 14, 2022; which are hereby incorporated by reference in their entirety.

1. FIELD

The present disclosure relates to an additive manufacturing system and manufacturing method, and more particularly, to a system for additive manufacturing an object, that is capable of forming a laminated body, precisely and rapidly, based on the 3D model data provided.

2. BACKGROUND

The basic operation of an additive manufacturing system consists of a step of slicing a three-dimensional computer model into thin sections, a step of converting the result into two-dimensional position data, and a step of supplying the data to a control device, and the control device manufacturing a three-dimensional structure in an additive method.

Additive manufacturing entails numerous different manufacturing methods (for example, three-dimensional printing, thin film additive method, thermal melting additive method, etc.).

In a three-dimensional printing process, for example, building material is dispensed from a dispensing head having a series of nozzles, to deposit layers onto a support structure. In addition, depending on the building material, the layers may be cured or solidified using an appropriate device. Building materials may include model materials (which form an object) and support materials (which support the object as it is constructed).

In additive manufacturing, prototypes of functional components can be rapidly produced with minimal investment in machinery and labor. By providing quick and effective feedback to the designer by such rapid prototyping, it is possible to reduce the product development cycle and improve the design process.

Further, additive manufacturing can be used to promptly manufacture non-functional components, for example, to evaluate various aspects of a design (e.g., aesthetic appearance, fitting, and assembly, etc.).

In addition, additive manufacturing has also proven to be useful in the medical field (modeling predicted outcomes prior to performing a treatment). Besides, fields such as architecture, dentistry, and plastic surgery, which involve lots of visualizing of specific designs or functions can benefit from rapid prototyping.

In many cases, however, the quality or accuracy was significantly lower than that of the 3D data where the laminated body of the completed additive manufacturing is provided, and when the additive material has a low viscosity, there was a problem in that the manufacturing speed becomes remarkably low.

Further, in order to increase the manufacturing speed, the viscosity of the additive material must be increased, but in the case of high viscosity, there was a problem in that the material is not properly discharged.

Especially, when forming a 3D structure using inkjet printing, there was a problem in that low-viscosity ink had to be used.

SUMMARY

Therefore, a purpose of the present disclosure is to resolve the problems of prior art mentioned above, that is to provide an additive manufacturing system, in which additive manufacturing can be performed at a rapid manufacturing speed by facilitating material discharge even when the additive material has high viscosity, and an additive manufacturing method thereof.

Another purpose of the present disclosure is to provide an additive manufacturing system, which can improve the quality of accuracy of a laminated body having completed the additive manufacturing, by applying an EHD method or hybrid method, and an additive manufacturing method thereof.

The aforementioned purposes may be achieved by an additive manufacturing system including a printing platform that sprays a droplet and that deposits the droplet on a substrate or a build platform by attractive-force control of an electric field to form at least one layer of a laminated body in a layer by layer method; a flattening unit that flattens a laminated body formed by the printing platform to a preset height; a curing unit that cures the laminated body flattened by the flattening unit; and a controller that controls the printing platform, the flattening unit and the curing unit.

Here, a charge neutralization unit that neutralizes the electric field after at least one layer is formed by the printing platform may be further included. Here, the neutralization unit may be an ion generator.

Further, the printing platform may include at least one nozzle equipped to discharge printing material; an electrode formed on an outer area of a discharge end of the nozzle; and a voltage controller for electrode, that is connected to a power supply to form an electric field between the electrode and one of a laminated body on the build platform, the substrate and the build platform, and to discharge a charged droplet from the nozzle through voltage control to deposit the droplet on the build platform along the electric field.

Further, the print platform may further include a piezo actuator installed to generate a pressure wave and pressurize the material of the chamber towards the discharge end; and a voltage controller for piezo actuator for drive control of the piezo actuator.

Further, the controller may include a spatial distribution calculation unit that analyzes spatial distribution of the electric field formed in a space between the nozzle, the laminated body being manufactured and the build platform; and a trajectory calculation unit that estimates a trajectory where the charged droplet flies along the electric field after being discharged from the nozzle, controlling a voltage magnitude or pulse signal being supplied to each nozzle such that the droplet is deposited on a target point along the estimated trajectory or moving the nozzle such that the droplet is deposited on the target point along the estimated trajectory.

Further, the controller may further include a database where spatial distribution data of the electric field formed between the nozzle, the laminated body being manufactured and the build platform according to printing environment and additive material, and trajectory data which indicates a trajectory where the charged droplet flies under the electric field after being discharged from the nozzle; and a printing algorithm that analyzes a depositing point of the droplet through machine learning of the spatial distribution data and the trajectory data accumulated in the database.

Further, the flattening unit may be configured as a pair of rollers of which each rotates about a center axis, and the pair of rollers being disposed to contact each other and being configured to move in the same direction by the controller, and one of the pair of rollers may be a hydrophobic roller, and the other may be a receptor roller to receive and remove the material smeared on the hydrophobic roller.

Further, the receptor roller may be installed so as not to contact the material after the hydrophobic roller passed through. Here, the curing unit may be configured as UV LED.

Further, the inspection unit may include a camera that photographs a surface image of the hydrophobic roller and a vibration sensor that measures a vibration of the hydrophobic roller, and the controller may analyze an image obtained from the camera and a vibration pattern obtained from the vibration sensor to inspect whether or not a laminate state of the laminated body formed by the printing platform is abnormal.

Further, the printing platform may further include a gantry unit that moves the printing platform in an x direction, y direction and z direction on the build platform.

Further, the nozzle may be grouped into two groups, and a first group may be configured to spray droplets of 3 pL or less, and a second group may be configured to spray droplets of 50 pL or more.

Further, the first group may be controlled through a vector scan, and the second group may be controlled through a raster scan.

Further, the first group may be configured to perform additive manufacturing at an edge area of the laminated body, and the second group may be configured to perform additive manufacturing at an inner area of the edge area. Here, the first group may be a single nozzle, and the second group may be multiple nozzles.

Meanwhile, an additive manufacturing method of an object by spraying a droplet and depositing the droplet by attractive-force control of an electric field in a layer by layer method, comprising: layer forming step that controls a voltage such that the droplet is discharged from a nozzle of a printing platform and the discharged droplet flies along the electric field and is deposited on a substrate, thereby forming at least one layer of the laminated body; flattening step that flattens the layer to a preset height by controlling the flattening unit; and curing step that cures the layer flattened by the flattening unit by controlling the curing unit; wherein the layer forming step, the flattening step, and the curing step are controlled by a controller may be provided.

Further, the layer forming step may include forming an electric field between the printing platform and the substrate, and applying a voltage through a voltage controller for electrode such that a meniscus is formed on a nozzle of the printing platform; and controlling a voltage of a piezo actuator such that a pressure wave is applied to a chamber of an upper portion of the nozzle to discharge the droplet from the nozzle.

Further, the layer forming step may include applying a voltage through a voltage controller for piezo actuator such that a pressure wave is applied to a chamber of an upper portion of the nozzle to form a meniscus on the nozzle of the printing platform; and forming an electric field between the printing platform and the substrate, and controlling a voltage of a voltage controller for electrode such that the droplet is discharged from the nozzle.

Further, neutralizing the electric field between the printing platform and the substrate may be further included, which is performed between the layer forming step, the flattening step, and the curing step, or simultaneously.

According to the present disclosure, there is provided an additive manufacturing system, in which additive manufacturing can be performed at a rapid manufacturing speed by facilitating material discharge even when the additive material has high viscosity, and an additive manufacturing method thereof.

Also, there is provided an additive manufacturing system, which can improve the quality of accuracy of a laminated body having completed the additive manufacturing, by applying an EHD method or hybrid method, and an additive manufacturing method thereof.

DETAILED DESCRIPTION

Figure 1:
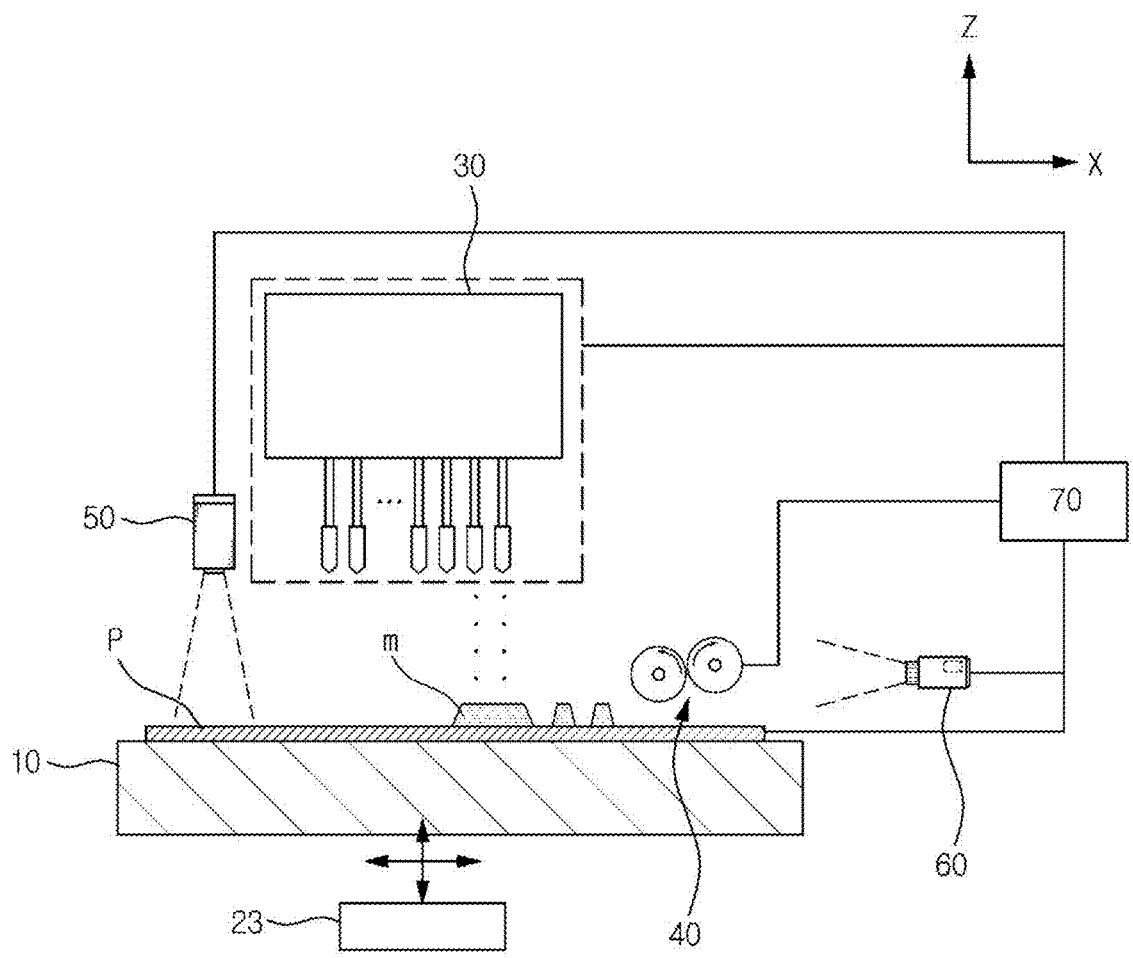
FIG. 1 is a schematic view of a system for additive manufacturing of an object according to the present disclosure.

Prior to the description, it should be noted that in various embodiments, components having the same configuration are typically described in the first embodiment using the same reference numerals, and in other embodiments, only the configurations that are different from the first embodiment will be described.

Hereinbelow, with reference to the attached drawings, a system for additive manufacturing of an object according to a first embodiment of the present disclosure will be described in detail.

FIG. 1 is a schematic view of a system for additive manufacturing of an object according to the present disclosure. Referring to FIG. 1, the system for additive manufacturing of an object according to the present disclosure (hereinafter referred to as "system") is configured to include a build platform 10, a gantry unit 20, a printing platform 30, a flattening unit 40, a curing unit 50, an inspection unit 60 and a controller 70.

The build platform 10 is where a support part for supporting an object subject to additive manufacturing is to be placed. In the present embodiment, the support part is described to be a substrate P, but there is no limitation thereto.

The build platform 10 is grounded or a voltage is applied so that an electric field is formed between the build platform 10 and a nozzle 32 that will be described later.

[Gantry Unit]

Figure 2:
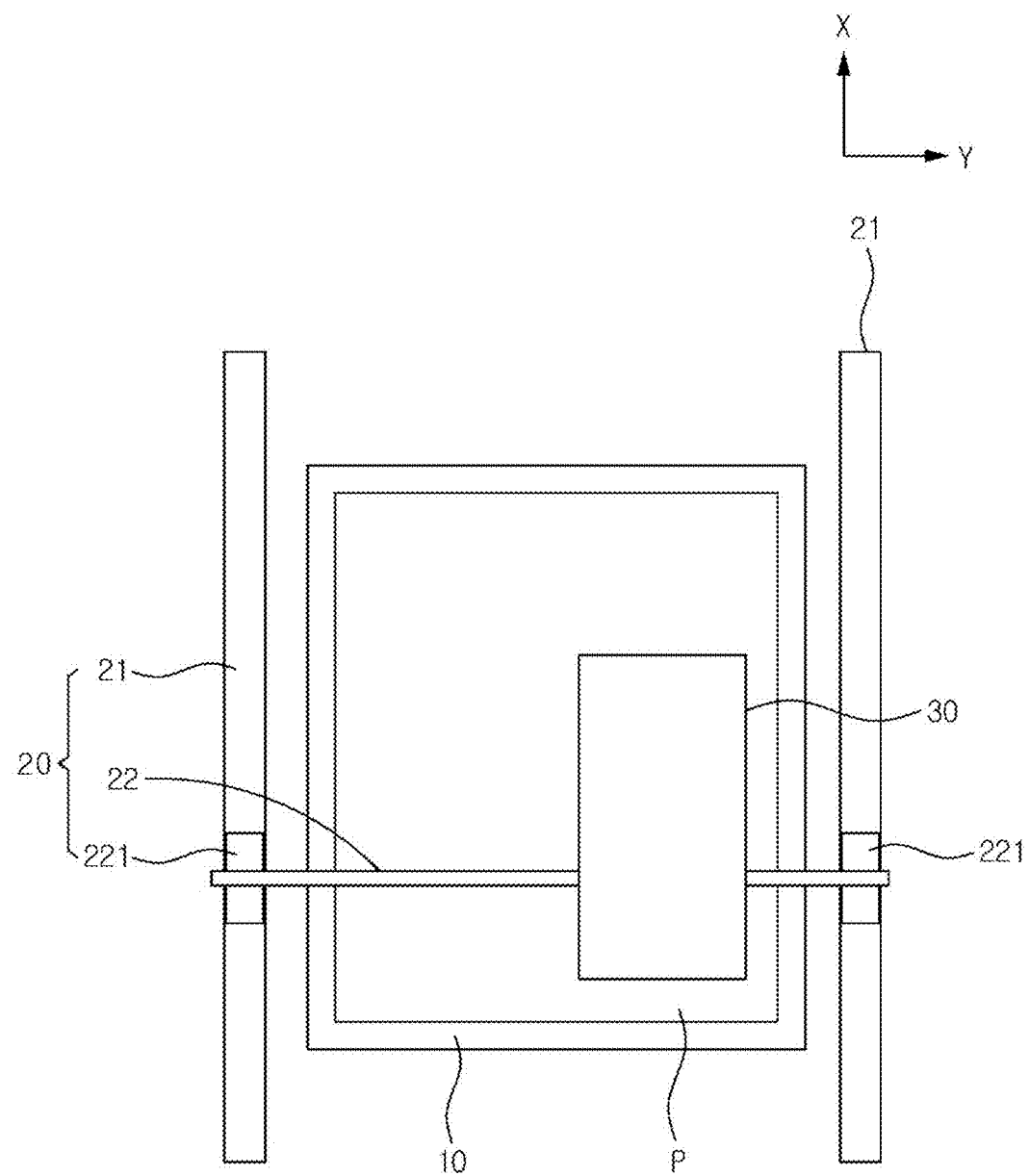
FIG. 2 is a plane view of a gantry unit of FIG. 1.

FIG. 2 is a plane view of the gantry unit of FIG. 1. The gantry unit 20 is configured to move a printing platform 30 (i.e., printing device or printing assembly) that will be described later in an x direction or y direction. Specifically, a roller and the printing platform are supported on a Y rail, and the Y rail 22 is coupled to an X rail 21 at both ends.

Here, the printing platform 30 is equipped on the Y rail 22 using any of a variety of methods and devices known in the related art, such that the printing platform 30 is supported on the Y rail 22 and moves along the Y rail 22.

Any of a variety of motors or actuators and devices for control known in the related art may be used to accurately control and move the movement of the printing platform 30 along the Y rail 22.

A carriage 221 may be equipped at both ends of the Y rail 22 and coupled to two X rails 21 at both ends of the Y rail 22, so that the Y rail 22 can move along the X rail 21.

The movement and control of the carriage 221 along the X rail 21 may be possible using any of a variety of motors or actuators and devices for control known in the related art. For example, a step motor with a linear encoder or a piezoelectric motor can be used.

Meanwhile, the gantry unit 20 includes a platen gantry 23 configured to move the build platform vertically along a z axis during manufacture of a substrate (refer to FIG. 1.)

Therefore, as a layer of the substrate P is formed, the platen gantry 23 may lower the build platform vertically or along the z axis when necessary. Further, the platen gantry 23 may also be configured to move the build platform along the x axis, for example, along a build route, to enable another process to be performed on the substrate P.

[Printing Platform]

A system for additive manufacturing of an object according to the present disclosure may be a printing platform configured to perform a on-demand component manufacturing process in order to accurately construct a support part to be used in forming a 3D component or one part thereof.

Figure 3:
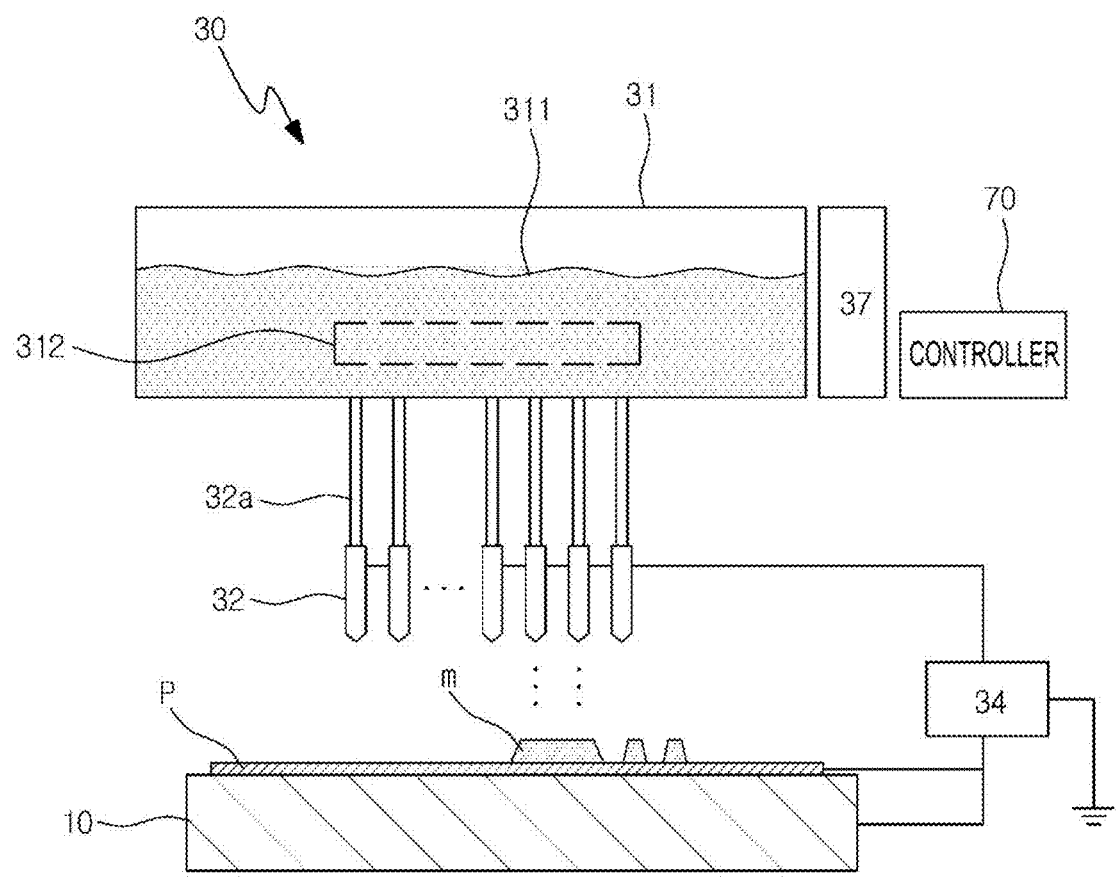
FIG. 3 is a detailed view of a printing platform of FIG. 1.

FIG. 3 is a detailed view of the printing platform of FIG. 1. Referring to FIG. 3, the printing platform 30 may be configured to include a container 31, a nozzle 32, an electrode 33 and a voltage controller for electrode 34.

The printing platform 30 includes a supply system of a melt or consumable fluid material 311, or a melt pool. The supply system includes a container 31 for storing the melt or consumable fluid material 311 for dispensing, in the form of a melt pool, configured to hold or create the melt or consumable material 311.

The container 31 includes a heater 312 (for example, heating element, heat pipe, etc.) for maintaining the melt or fluid state of the consumable fluid material 311 and/or transforming a solid material into a melt or consumable fluid material 311.

The heater 312 may be positioned inside the container 31 or below the container 31 or along a side of the container 31. The heater 312 may be controlled by the controller 70 based on, for example, a temperature signal output from a temperature sensor indicating a temperature of the consumable fluid material 311 inside the container 31. Through such temperature control of the heater 312, the viscosity of the fluid material can be controlled.

Further, the printing platform 30 includes one or more nozzle 32, and each of the nozzle is configured to accommodate the consumable fluid material 311 of the container 31 through a corresponding channel 32*a*. When composed of a plurality of nozzles, they are arranged in an array as shown.

That is, the nozzle 32 may form the array to be distributed within a plane defined by an x axis and a y axis. The nozzle 32 array is not limited to the illustrated shape but may take a different shape or configuration.

Meanwhile, in the present embodiment, the consumable fluid material 311 is ink. Viscosity, droplet volume and the like of the ink may be determined according to usage, and this ink may be provided as a conductive ink and the like that further includes a conductive material and the like in order to have conductivity.

Here, the ink droplet volume may be less than 3 pL or greater than 50 pL, and the viscosity may be 20 cP or more, at 25° C.

Further, the nozzle 32 may be an Electro HydroDynamic (EHD) inkjet type nozzle, or a hybrid inkjet type nozzle combining a piezoelectric type and an EHD inkjet type.

Figure 4:
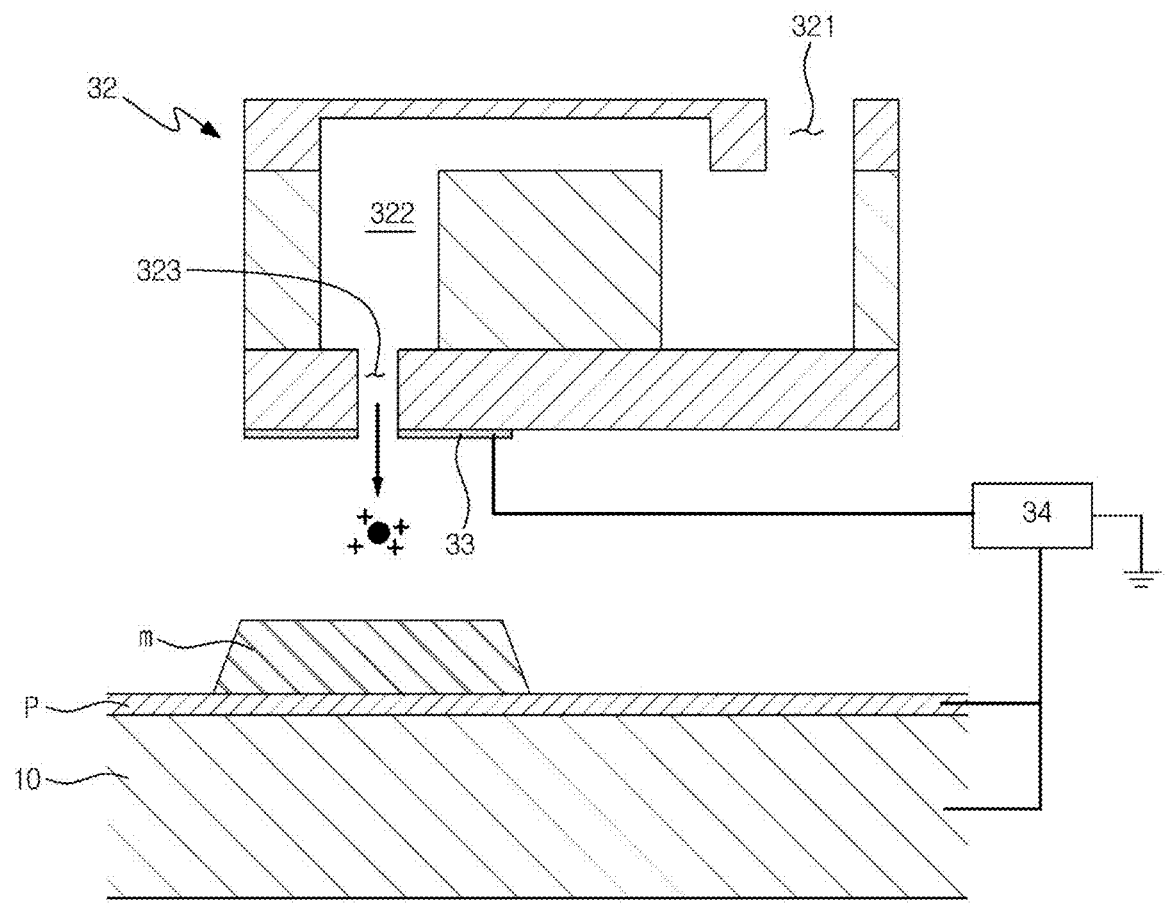
FIG. 4 is a longitudinal section view of a nozzle of FIG. 3.

First, the EHD inkjet type nozzle will be described. FIG. 4 is a longitudinal section view of the nozzle of FIG. 3. Referring to FIG. 4, the EHD inkjet type nozzle 32 may include, at one side of its upper portion, an inlet 321 into which ink may be introduced through the channel 32*a*, a chamber 322 in which the ink introduced through the inlet 321 may be stored, and an discharge end 323 through which the ink may be discharged, at one side of a lower end of the chamber 322.

The electrode 33 may be formed in an adjacent area (outside, in the present embodiment) of the discharge end 323, and here, the electrode 33 may be formed to cover the outside with an insulator (not illustrated) to inhibit contact with the ink. Further, the electrode 33 may be connected to a voltage controller for electrode 34 and voltage controlled.

By the voltage control of the electrode 33, an electrostatic force may be induced to a meniscus formed at the discharge end 323, so that droplets can be jetted (discharged).

The voltage controller for electrode 34 may be installed to be connected to the electrode 33 and the substrate P or build platform (10 in FIG. 2) through a high voltage power supply (not illustrated), to create a high potential difference between the nozzle 32 and the substrate P and build platform 10 and modulate the voltage. That is, through the voltage controller for electrode 34, an electric field may be formed between the nozzle 32 and the substrate P and build platform 10, and the formed electric field may be controlled. The voltage controller for electrode 34 may control modulation and the like by its own algorithm, or may be controlled by a controller 70 that will be described later.

Here, the voltage controller for electrode 34 may be selectively connected to either one of the substrate P or the build platform 10, and even if the voltage controller for electrode 34 is selectively connected to either one of the substrate P or the build platform 10 as such, both the substrate P and the build platform 10 may be grounded or connected to a common potential.

Meanwhile, the voltage controller for electrode 34 may selectively modulate the voltage individually for each nozzle 32 in order to precisely control the discharge of ink droplets from each nozzle 32 to the substrate P.

According to the modulation of the voltage controller for electrode 34 mentioned above, the ink inside the chamber 322 may form a meniscus in the discharge end 323, and the meniscus may be discharged from the nozzle 32 and discharged as ink droplets.

The ink droplets discharged from the nozzle 32 may be accurately deposited on a desired position by the charged droplet attraction-control by electric field. That is, individual droplets may fall in a precise manner onto the substrate P to form a laminated body m.

That is, by the voltage applied to the nozzle 32, an electric field is formed between a space between the nozzle 32 and the substrate P and the laminated body m that is being deposited. The existing laminated body m formed on the substrate P forms a common potential as the substrate P, and thus as a result, the droplets discharged from the nozzle 32 can be accurately deposited on top of the existing laminated body m.

Next, the hybrid inkjet type nozzle will be described. The hybrid inkjet type is a nozzle combining a piezoelectric type and an EHD inkjet type, and can improve printing performance by improving discharge precision.

Figure 5:
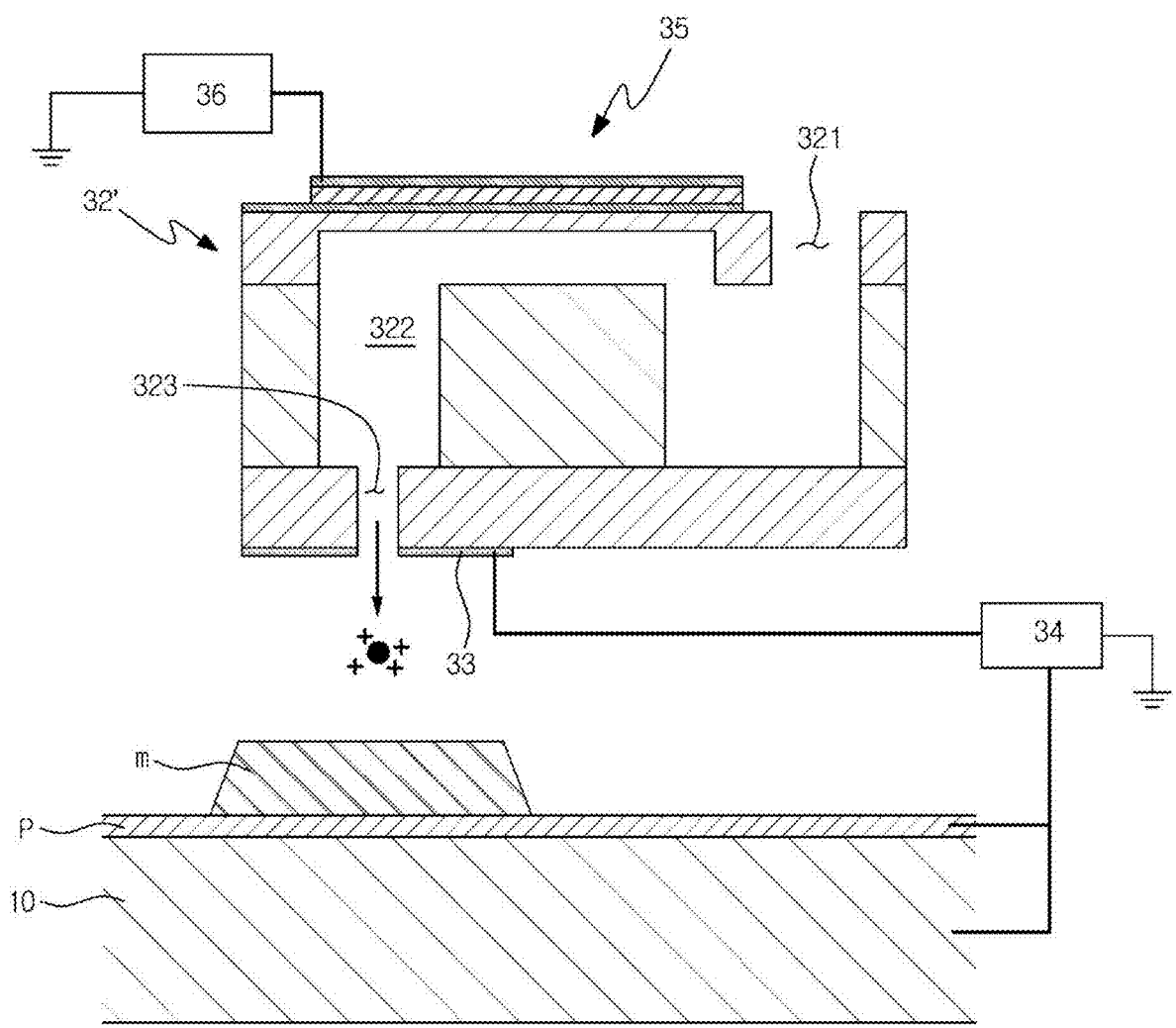
FIG. 5 is a schematic view of a nozzle of a hybrid inkjet method.

FIG. 5 is a schematic view of the hybrid inkjet type nozzle. Referring to FIG. 5, the hybrid inkjet type nozzle 32' includes, on an upper portion of the nozzle 32' as in FIG. 5, a piezo actuator 35 that applies pressure for discharging droplets through the discharge end 323, and further includes a voltage controller for piezo 36 that is connected to the piezo actuator 35.

Here, the piezo actuator 35 may be provided such that electrodes are formed on each of the upper and lower surfaces of a piezoelectric body, and thus to drive in a vertical direction. In addition, the voltage controller for piezo 36 may be connected with the controller 70 that will be described later, and be controlled.

In the case of the hybrid inkjet type nozzle 32', the voltage controller for piezo 36 for controlling the drive of the piezo actuator 35 may be connected to drive electrodes (at least one of the electrodes formed on the upper and lower surfaces of the piezoelectric body) of the piezo actuator 35. The piezo actuator 35 of the present embodiment is illustrated to have electrodes formed above and below the piezoelectric body, but there is no limitation thereto, and thus, a piezo type inkjet device having a different existing structure may be configured. Specific matters besides the aforementioned configuration are already well known in the related art, and thus other detailed description will be omitted.

The method for discharging ink droplets with the hybrid inkjet type nozzle is as follows. When the voltage controller for electrode 34 applies a voltage to the electrode 33, a liquid surface protrudes outward from the discharge end 323, forming a meniscus. Here, by the voltage controller for piezo 36, the piezo actuator 35 is driven, to generate a pressure wave, and the pressure wave is transmitted to the discharge end 323 through the chamber 322, to push the meniscus outward and separate it from the nozzle 32, thereby discharging the droplets. Here, the droplet may be discharged by only applying the voltage of the voltage controller for electrode 34.

Meanwhile, the aforementioned control method for discharging droplets is presented as an example, and by controlling a voltage signal applied to the piezo actuator 35 and a voltage signal applied to the electrode 33 according to a predetermined control method, the droplet may be discharged. For example, a voltage signal applied to the piezo actuator 35 and a voltage signal applied to the electrode 33 may be synchronized and applied at intervals of a predetermined time so as to discharge droplets.

The principle of depositing droplets using the nozzle described above will be described.

Figure 6:
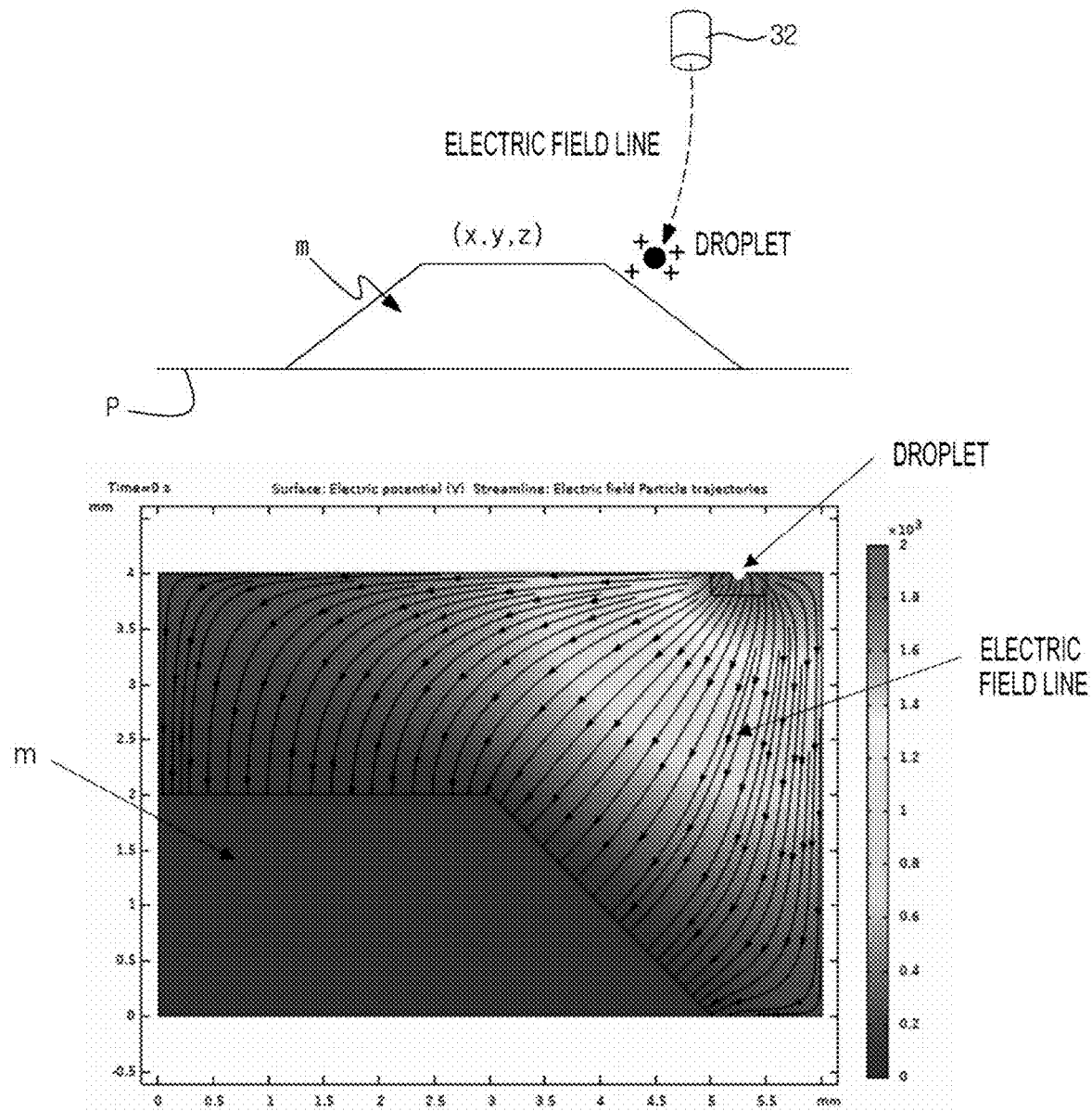
FIG. 6 is a schematic view showing a trajectory of a droplet flying along an electric field.

FIG. 6 is a schematic view showing the trajectory of a droplet flying along an electric field. Referring to FIG. 6, the droplet discharged from the nozzle 32 is in a charged state, and thus the speed and flight trajectory of the droplet are determined by the relationship between the electric force due to the electric field distribution in space and the inertial force due to the discharge, gravity, and air resistance force.

The electric field formed in the space between the nozzle and the build platform is expressed in Maxwell's equation.

$$\nabla \cdot \varepsilon \nabla \phi = -\rho$$

$$E = -\nabla \phi$$

E is electric field (V/m), $\varphi$ is the voltage (V), $\varepsilon$ is the permittivity (Coulomb/Vm), and $\rho$ is the charge density (Coulomb/m$^3$).

The electric field obtained from the above equation is three-dimensional spatial information, and the electric force acting on the charged droplet present in the electric field can be expressed in Coulomb force.

The flight speed and flight trajectory of the charged droplet can be obtained by the following equation according to Newton's second law.

$$m \frac{\partial v}{\partial t} = q_{drop} E + mg$$

v is the speed (m/s), t is the time (second), g is the gravitational acceleration, $q_{drop}$ is the charge amount of the droplet (Coulomb), and m is the droplet mass (kg). Air resistance can also be added to the right term.

Since the flight trajectory of the droplet varies according to the spatial electric field distribution, the trajectory of the droplet must be controlled for an accurate additive process. For this purpose, it can be controlled using the voltage magnitude and pulse applied to the nozzle 32 using the voltage controller 34 and a nozzle driver.

For example, by reducing the magnitude of the electric force by the electric field by lowering the magnitude of the voltage or shortening the duration of the application pulse to apply a small amount of charge to the droplet, it is possible to ensure that the droplet is accurately deposited on the target point along the estimated trajectory.

In the case where the voltage magnitude and pulse are not controlled, the nozzle 32 may be controlled to directly move so as to be suitable for the electric field in which the droplet is formed, so that the droplet may be deposited on the target point along the estimated trajectory.

Meanwhile, by accumulating a database regarding the distribution of the electric field and the flight trajectory of the droplet in the controller 70 that will be described later, and continuously accumulating the data in printer software that repeats the experiment, it is possible to estimate the distribution of the electric field and the trajectory of the droplet formed from those data, and improve the accuracy and precision of the droplet depositing. Here, optimization of the additive process can be performed through droplet trajectory estimation using machine learning and AI algorithms.

The distribution of the electric field may differ depending on the position and shape of the nozzle 32 applying the voltage, the size of the substrate P, the material of the substrate P, the printing environment, the viscosity of the ink, the density of the ink, and the electrical conductivity of the ink, and the dielectric constant of the ink and the like. Optimal processes using AI algorithms are possible when the additive process is performed with specific ink by accumulating the surrounding environment variables and process variables of the printer as data.

The ink droplet discharged from the nozzle 32 through such optimal processes may be deposited accurately on top of the existing laminated body m.

Therefore, the printing platform 30 may accurately form the laminated body m of a desired form on the substrate P by precisely controlling the average diameter (1 pL to 100 pL) of the droplet within about 1 µm to about 100 µm range.

Further, the laminated body m may be formed in a single layer, or a plurality of layers may be deposited in a layer by layer method.

[Charge Neutralization Unit]

The charge neutralization unit (37 in FIG. 3) is provided as a soft X-ray ionizer and the like that generates ions using radiation, and serves to neutralize the electric field formed between the nozzle 32 and the substrate P after the additive process of a layer or a certain area by the printing platform 30. For this purpose, the charge neutralization unit 37 may be installed to move together with the container 31, or may be provided separately to perform the aforementioned functions.

[Flattening Unit]

Figure 7:
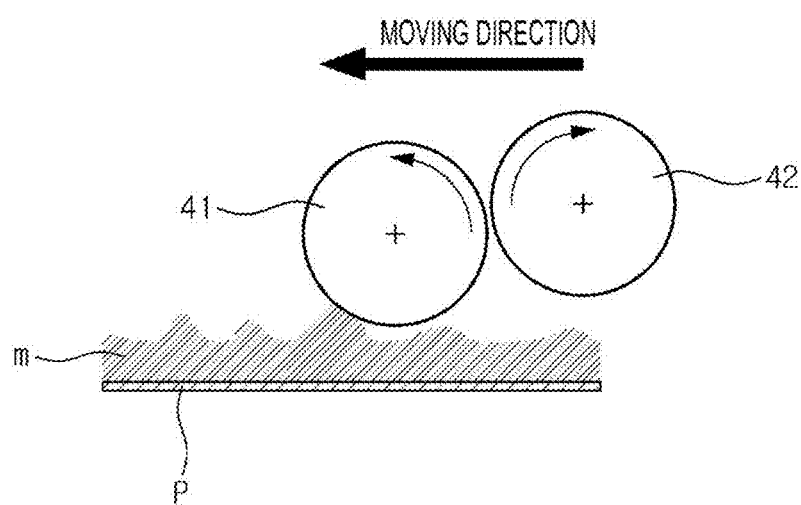
FIG. 7 is a detailed view of a flattening unit of FIG. 1.

FIG. 7 is a detailed view of the flattening unit of FIG. 1. Referring to FIG. 7, the flattening unit is configured as one pair of rollers and each roller rotates about a roller axis, and the rollers rotate in contact with each other.

Of the one pair of rollers, a first roller 41 is a hydrophobic roller, and a second roller 42 is an acceptor roller, and the second roller 42 is positioned in a relatively higher position than the first roller 41, and thus the second roller 42 does not come into contact with the pattern m flattened by the first roller 41. That is, the material smeared on the first roller 41 while passing through the layer deposited on the substrate P is removed through the second roller 42, wherein the second roller 42 may maintain a clean state since it does not come into contact with the pattern m.

Meanwhile, the material removed through the second roller 42 may be stored through a separate storage container (not illustrated).

The flattening unit is installed to move in the same direction as the moving direction of the Y rail 21 of the gantry unit 20, and may be disposed to trail the printing platform 30 mentioned above (refer to FIG. 2).

That is, a layer sprayed by the printing platform 30 and deposited on the substrate P may be flattened to a preset height by the flattening unit 40.

In addition, when depositing in a layer by layer type, the printing platform 30 may flatten each layer of the laminated body while moving together.

[Curing Unit]

Figure 8:
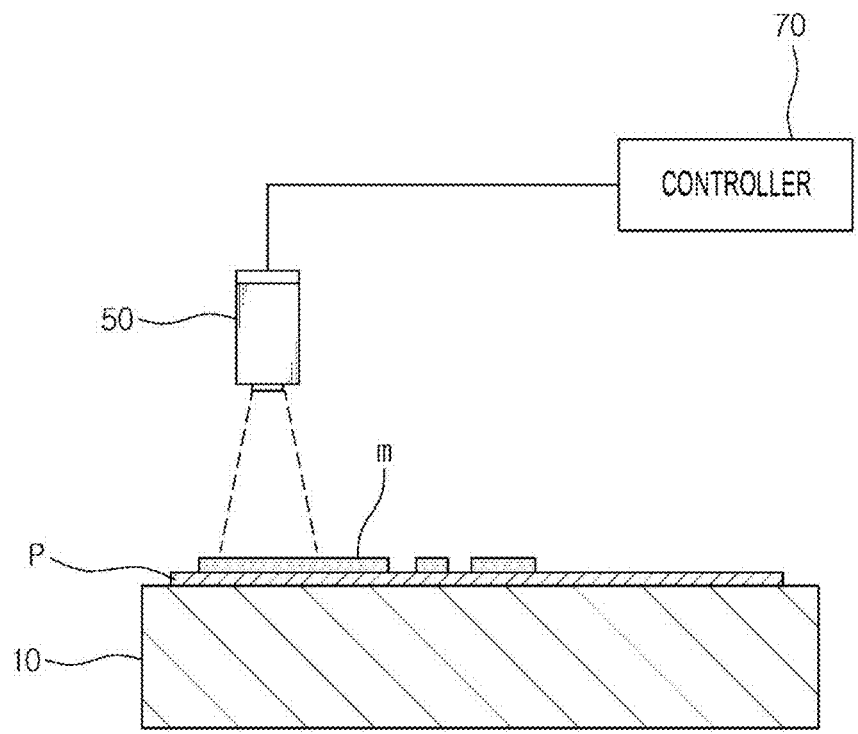
FIG. 8 is a detailed view of a curing unit of FIG. 1.

FIG. 8 is a detailed view of a curing unit of FIG. 1. Referring to FIG. 8, the curing unit 50 is equipped as a UV LED or UV laser, and is configured to cure the laminated body m deposited on the substrate P.

The wavelength range and irradiation time of the curing unit 50 may differ depending on the material being deposited. Further, in the case of forming a pattern such as an electrode or wiring on a substrate, a UV curing monomer or conductive ink in which conductive particles are dispersed is used as the additive material. Here, gold, silver, copper, graphene, mxene and the like may be used as the conductive material of the additive material, to secure the conductivity.

In addition, the curing unit 50 may be equipped to move together with a separate transfer device or printing platform 30, and be controlled by the controller 70.

That is, the curing unit 50 cures the corresponding laminated body m after the flattening unit 40 flattens the laminated body m.

[Inspection Unit]

Figure 9:
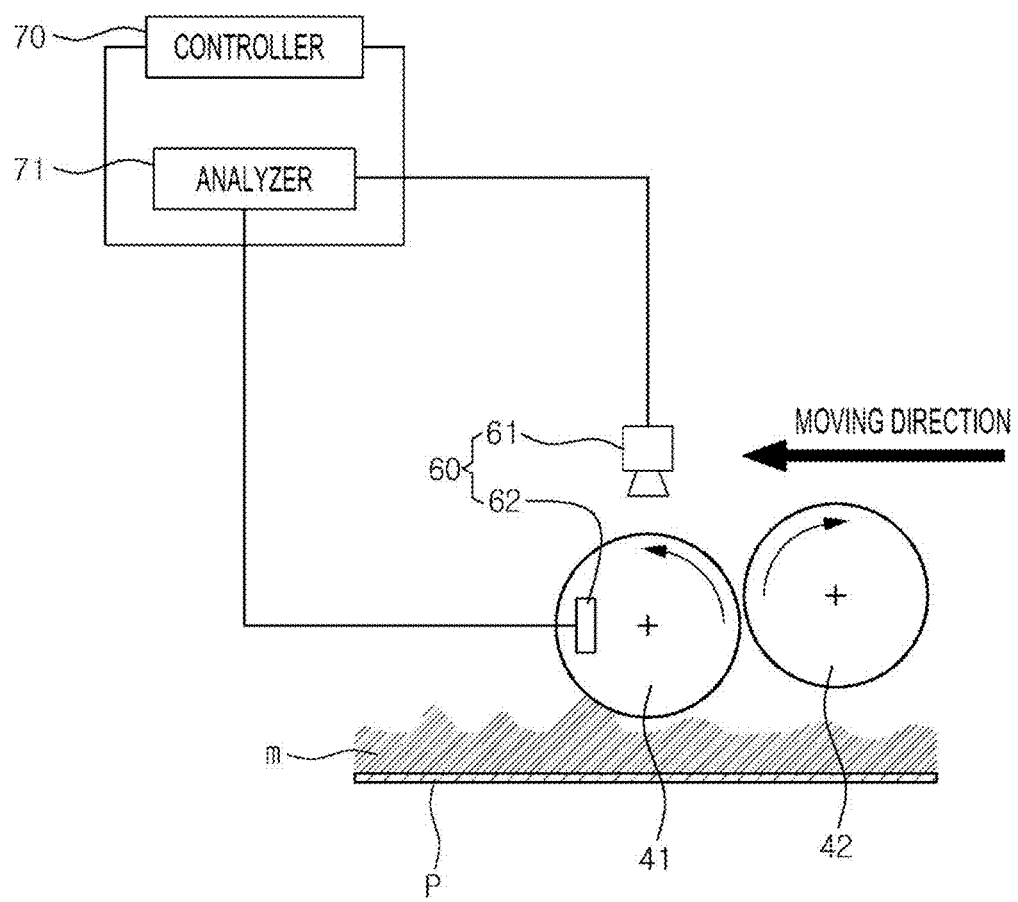
FIG. 9 is a detailed view of an inspection unit of FIG. 1.

FIG. 9 is a detailed view of an inspection unit of FIG. 1. Referring to FIG. 9, the inspection unit 60 is configured to include a camera 61, a vibration sensor 62 and an analyzer 71.

The inspection unit 60 may inspect defect, curling and shrinkage and the like of the laminated body m.

For this purpose, when the camera 61 obtains the surface state of the hydrophobic roller 41 in images and transmits the same to the controller 70, the analyzer 71 may analyze the surface state of the hydrophobic roller 41 and analyze the state of the laminated body m contacting the hydrophobic roller 41.

Further, when a vibration signal generated from the hydrophobic roller 41 is transmitted to the controller 70 through the vibration sensor 62 installed in the hydrophobic roller 41, the state of the laminated body m contacting the hydrophobic roller 41 may be analyzed by analyzing the vibration pattern in the analyzer 62.

For this purpose, the analyzer 71 is configured to be able to compare and contrast the designed 3D model, the object data of the laminated body and the vibration pattern of the hydrophobic roller 41.

In addition, the 3D model, the object data of the laminated body, and the vibration pattern and the like may be stored in the controller 70 in advance, or may be stored in a server connected through a network.

As a result, the inspection unit 60 may analyze the images and vibration pattern together, to inspect the defect, curling and shrinkage and the like of the laminated body m flattened by the hydrophobic roller 41, in real time.

[Controller]

Next, the controller of FIG. 1 will be described. The controller 70 may be one or more processors configured to execute instructions that may be stored locally in a memory of the system or in a memory remotely connected to the system to control the components for performing one or more functions of the system.

Further, the controller 70 also includes one or more control circuits, microprocessor-based engine control systems or digitally-controlled raster imaging processor systems, and may be configured to operate components of the system in a synchronized manner based on print commands received from, for example, a host computer or from a remote location.

In addition, the controller 70 may receive a sliced layer of a desired 3D component or support structure, thereby enabling the system to generate the 3D component or support structure, for example, in a layer by layer manner.

Further, the controller 70 may be equipped with a circuit for controlling the build platform, gantry unit, printing platform, curing unit, flattening unit and inspection unit and the like mentioned above, and may include a sequence for sequentially operating the entire system.

In addition, the controller 70 may include a spatial distribution calculation unit that considers the spatial distribution of the electric field formed between the nozzle 32, the laminated body m being manufactured, and the build platform 10, and a trajectory calculation unit that estimates the trajectory where a charged droplet flies along the electric field after being discharged from the nozzle.

That is, the pulse signal or voltage magnitude supplied to each nozzle 32 may be controlled such that the droplet is deposited on a target point according to the estimated trajectory. Otherwise, the nozzle 32 may be moved such that the droplet is deposited on a target point according to the estimated trajectory.

Further, the controller 70 may further include a database where each data by the spatial distribution calculation unit and the trajectory calculation unit are stored, and a printing algorithm.

The spatial distribution data is the spatial distribution data of the electric field formed between the nozzle 32, the laminated body being manufactured and the build platform according to the printing environment and additive material, and the trajectory data may be the trajectory data that is the trajectory where the charged droplet flies under the electric field after being discharged from the nozzle.

The printing algorithm may be an algorithm that analyzes a droplet depositing point through machine learning on the spatial distribution data and trajectory data accumulated in the database.

By the database and the printing algorithm, accuracy of the depositing point of the droplet can be further improved.

[Vector Scan and Raster Scan]

In order to form at least one layer of the laminated body m, depositing the material according to the two-dimensional position data may be possible by the controller 70 setting a relative motion between the printing platform (for example, printing head, extrusion nozzle, etc.) and the working surface.

Two types of motion patterns referred to as the raster scan and vector scan are known to the related art.

Raster scan is generally characterized by a back and forth relative motion between the printing platform and the working surface, and normally, multiple nozzles are used for side-by-side depositing.

During the raster scan, the printing platform visits all positions of the working surface by the gantry unit 20, and here, the controller may selectively activate or inactivate the nozzle of the printing platform regarding each position visited according to the two-dimensional position data.

In the vector scan, the printing platform is controlled to move by the aforementioned gantry unit 20, but does not visit all positions of the working surface. Instead, the printing platform moves along the route selected based on the position where depositing the material is necessary.

Figure 10A:
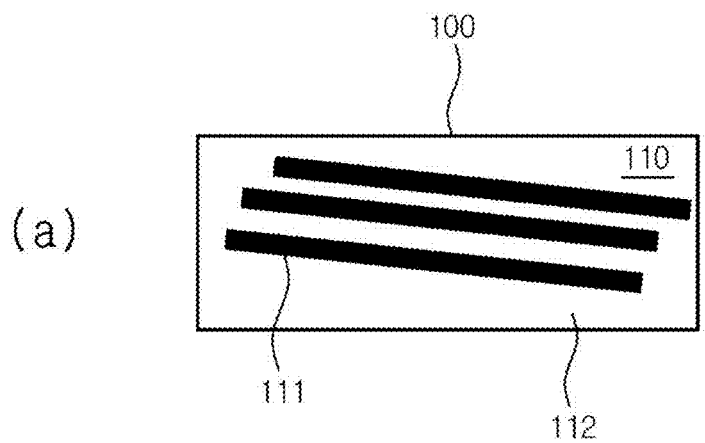
FIGS. 10A-10D are views of laminated body formation by vector scan and raster scan.

For example, as in FIG. 10A, while moving along the route set by the vector scan in the working area 100 of at least one layer 110, it may form a plurality of elongated structures 111.

Figure 10B:
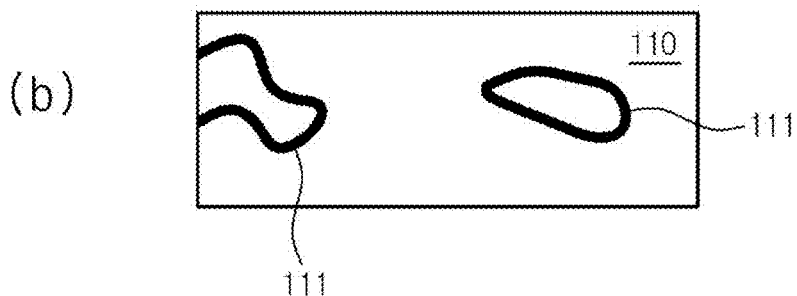

Further, as in FIG. 10B, the structure 111 may be a boundary structure that at least partially surrounds the area filled with the additive material, and the boundary structure may be formed in at least one layer 111 by the vector scan.

Figure 10C:
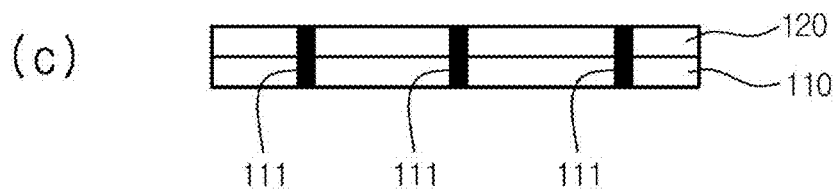

In addition, as in FIG. 10C, the structure 111 may be an inter-floor connection structure that connects at least two layers 110, 120. In such an example, the structure is desirably smaller than the entire size of the layer (for example, less than 1%).

Meanwhile, as illustrated in FIG. 10A, the structure 111 may be embedded within the area formed by the raster scan. For example, the working area 100 of the layer 110 may be formed by the raster scan, and the structure 111 is embedded within the working area 112.

Figure 10D:
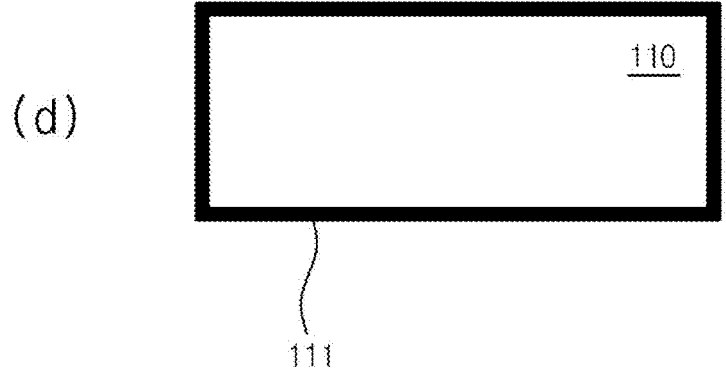

In addition, as in FIG. 10D, the structure 111 may be a peripheral edge on any one layer 110.

Figure 11:
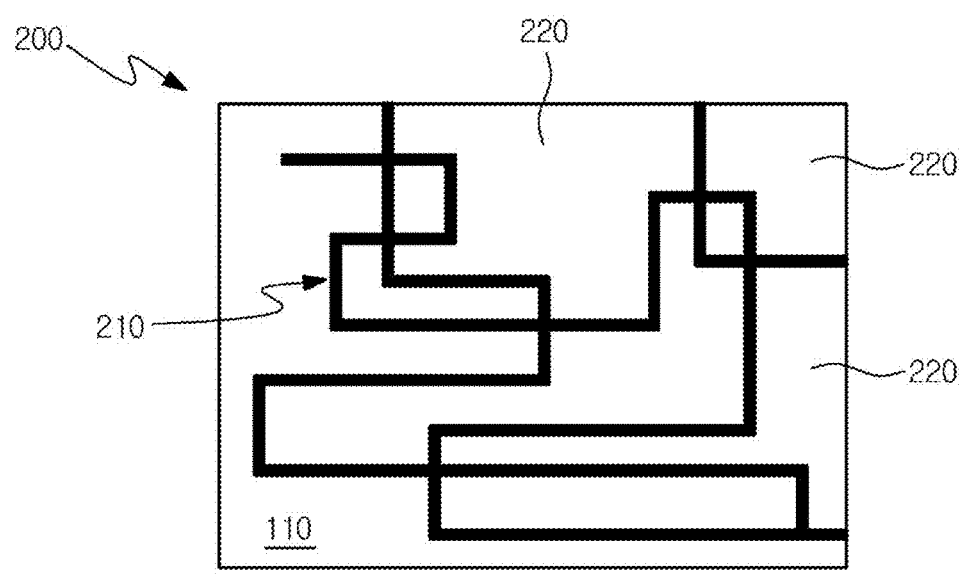
FIGS. 11 and 12 are detailed views of a product manufactured using the vector scan and raster scan.
Figure 12:
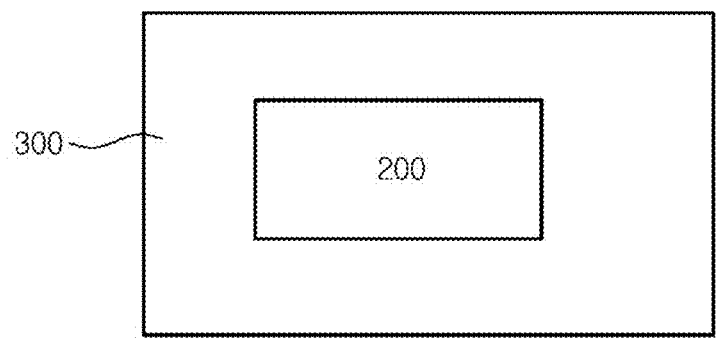

Manufacturing of articles using vector scan and raster scan will be described in detail. FIGS. 11 and 12 show state of a product manufactured using the vector scan and raster scan.

Referring to FIG. 11, the manufactured product 200 may include multiple layers which are manufactured with a nonconductive material through 3D printing, and at least one layer (FIG. 10A, 110) of the multiple layers may include a pattern of conductive line made of electrically conductive material.

The pattern 210 of the conductive line made of an electrically conductive material may be deposited on or embedded in an area 220 of a non-conductive material.

Here, the pattern 210 may be manufactured by the vector scan, and the area 220 may be manufactured by the raster scan.

In addition, referring to FIG. 12, the device 300 may be a large-area electronic device, such as an optoelectronic system, an active matrix display system, a projector display system, a sensor, an identification tag, a memory medium, a smart card (e.g. a microprocessor card, an encryption card, an ATM card, a SIM, also known as subscriber identification module card), projector displays, batteries, electronic components such as diode systems and transistor systems, and the like.

That is, the manufactured product 200 may be deposited in 3D using conductive and non-conductive materials using the vector scan and raster scan in any one area included in the device 300.

Figure 13:
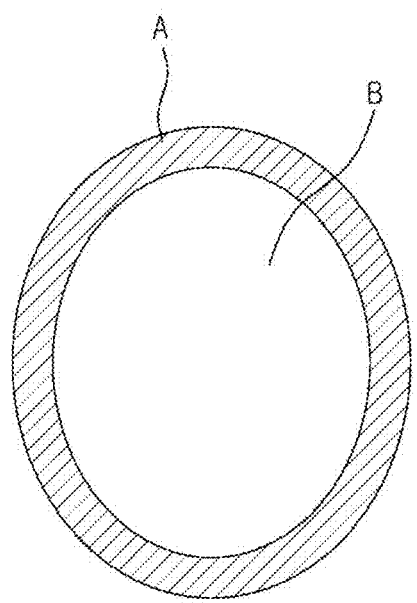
FIG. 13 is a schematic view of a additive state of a laminated body by an additive manufacturing system according to another embodiment of the present disclosure.

Next, another embodiment of the additive manufacturing system according to the present disclosure will be described. FIG. 13 is a view of an additive state of a laminated body by an additive manufacturing system according to another embodiment of the present disclosure.

In a second embodiment of the present disclosure, the nozzle is grouped into two groups. Any one group is provided to spray droplets of 3 pL or less, and the other group is configured to spray droplets of 50 pL or more. Here, the viscosity of the droplets may be 20 cP or more at 25° C.

When the nozzle is grouped into two groups as mentioned above, a broader area such as B area sprays relatively larger droplets of 50 pL or more, and a small area such as A area, that is, an edge area sprays relatively small droplets with size of 3 pL or less.

Through this, the additive speed of the laminated body m may be improved.

Meanwhile, B area (broad area) may be controlled through the raster scan, and A area (small area) may be controlled through the vector scan. Further, during the raster scan, a broad area may be rapidly deposited through multiple nozzles, and during the vector scan, a small area must be formed precisely, and thus may be controlled to be formed through a single nozzle.

Next, an additive method using an additive manufacturing system according to the present disclosure will be described.

A method for additive manufacturing an object according to the present disclosure is a method of forming the object by sequentially depositing at least one layer. Here, the nozzle 32 will be described using a hybrid inkjet type nozzle as an example.

FIGS. 14 to 21 are schematic views illustrating a process of additive manufacturing an object according to the present disclosure.

Figure 14:
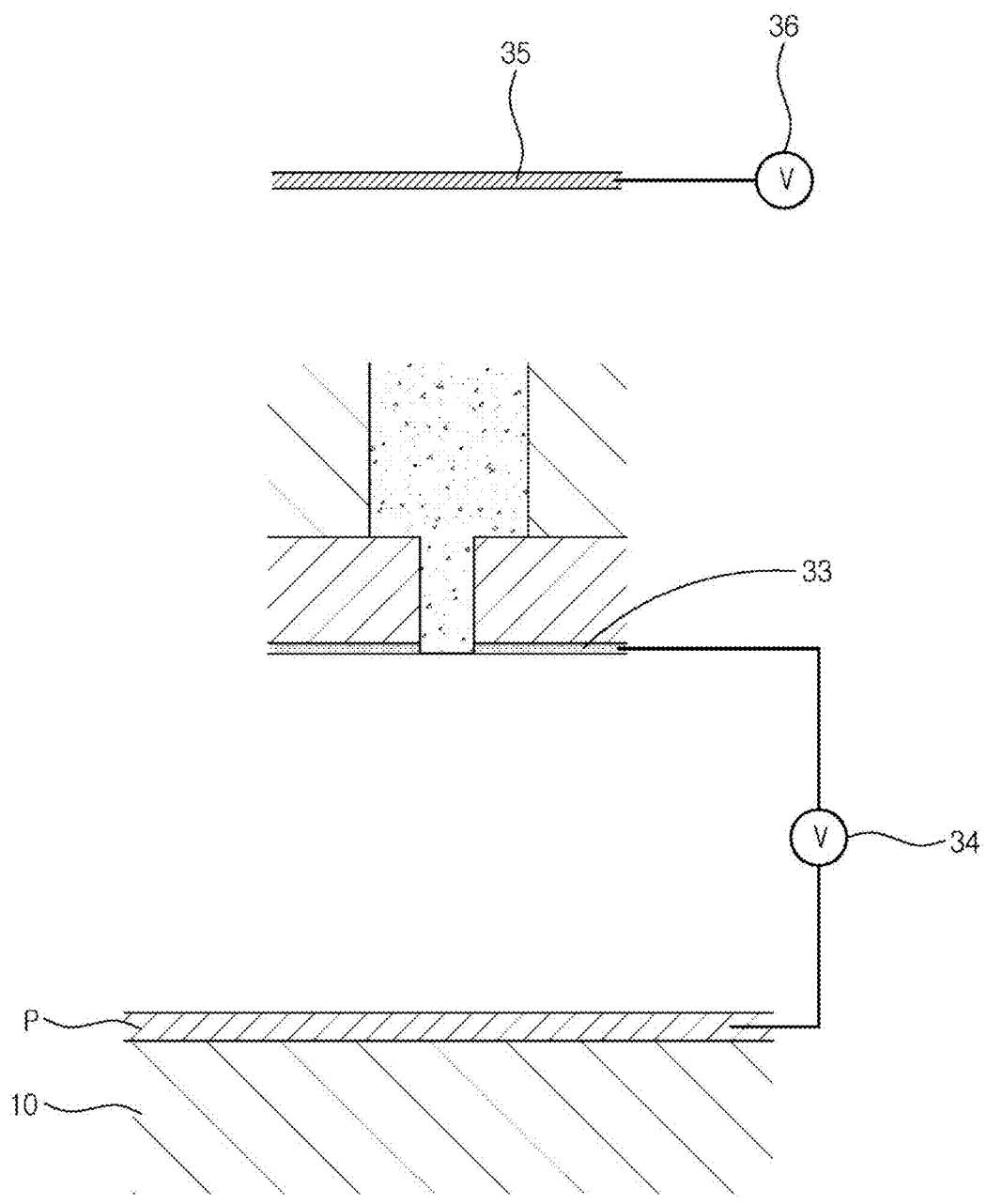
FIGS. 14 to 21 are schematic views illustrating a process for additive manufacturing an object according to an embodiment of the present disclosure.
Figure 15:
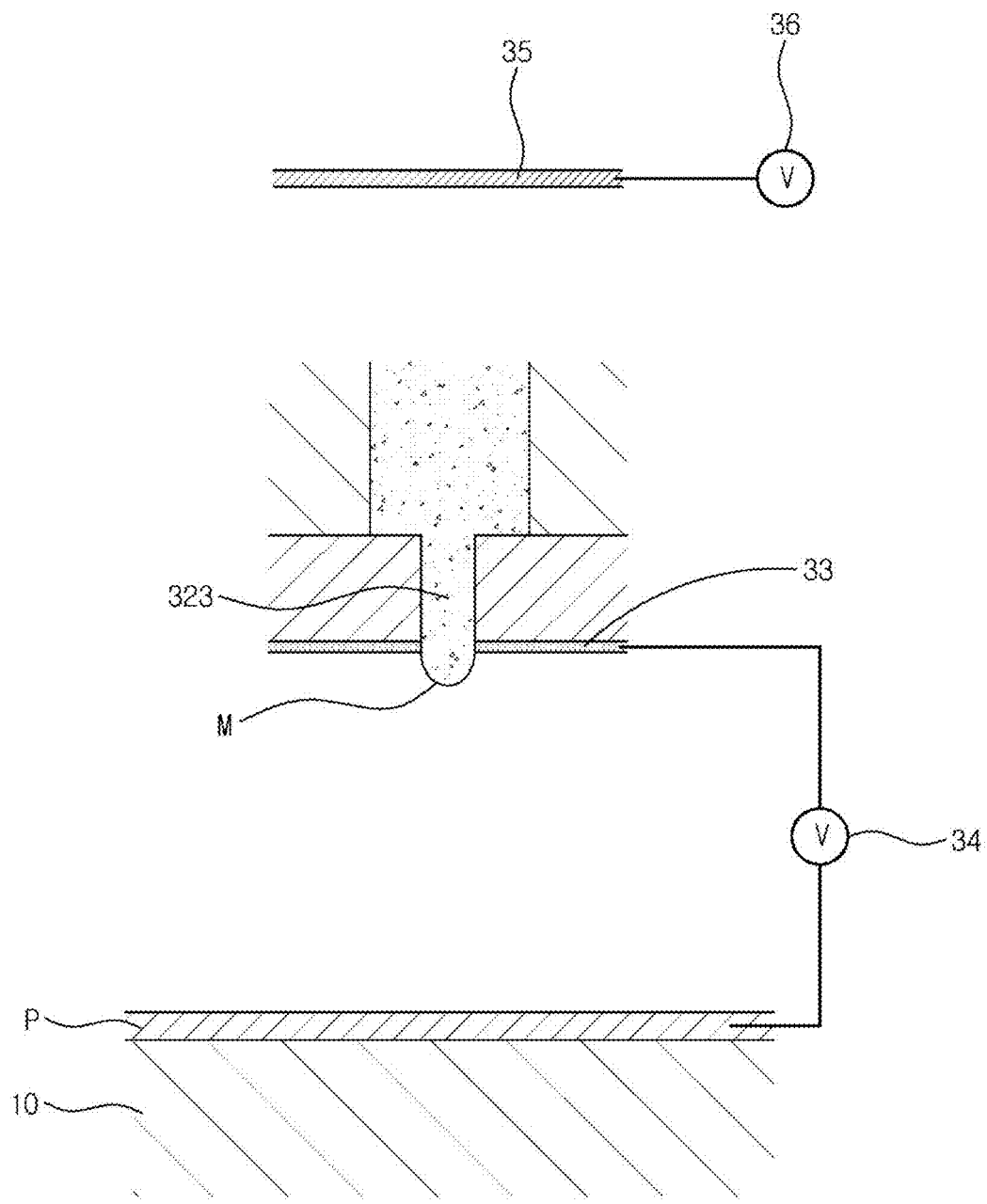

First, referring to FIG. 14, an electric field is formed between the printing platform 30 and an object that is a subject of additive manufacturing. That is, a voltage is applied to the voltage controller for electrode 34, to form an electric field between the nozzle 32 and the substrate P, and in such a state, as in FIG. 15, a meniscus M of ink is formed at the discharge end 323.

Figure 16:
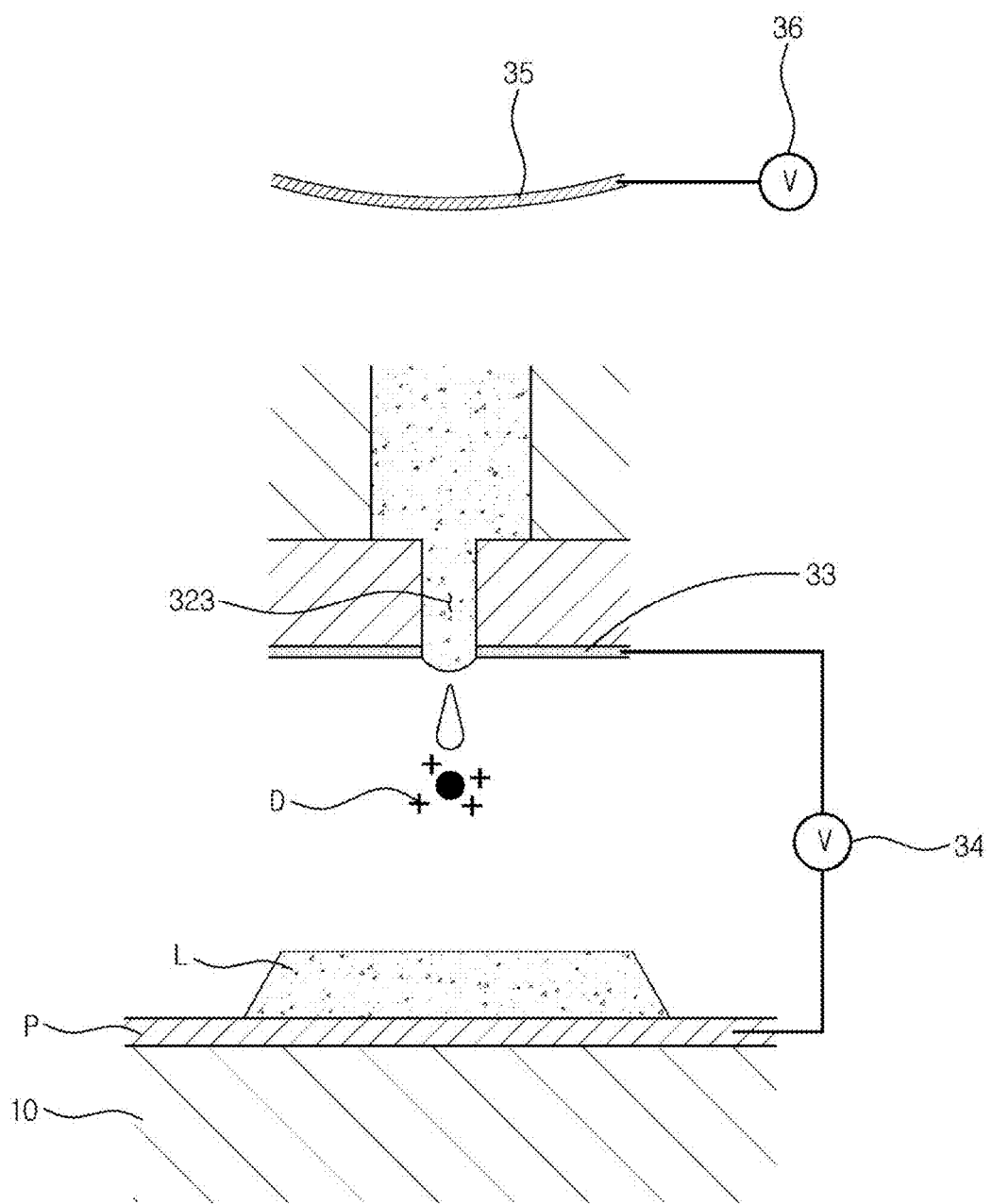

In addition, in a state where the meniscus M is formed, as in FIG. 16, when a voltage is applied to the piezo actuator 35 through the voltage controller for piezo 36, the piezo actuator 35 drives to generate a pressure wave to the chamber 322, and as the ink is pushed towards the discharge end 323 by the pressure wave, a droplet is discharged. The discharged droplet D is deposited on the substrate P along the electric field formed between the nozzle and the substrate P, thereby forming at least one layer L.

Figure 17:
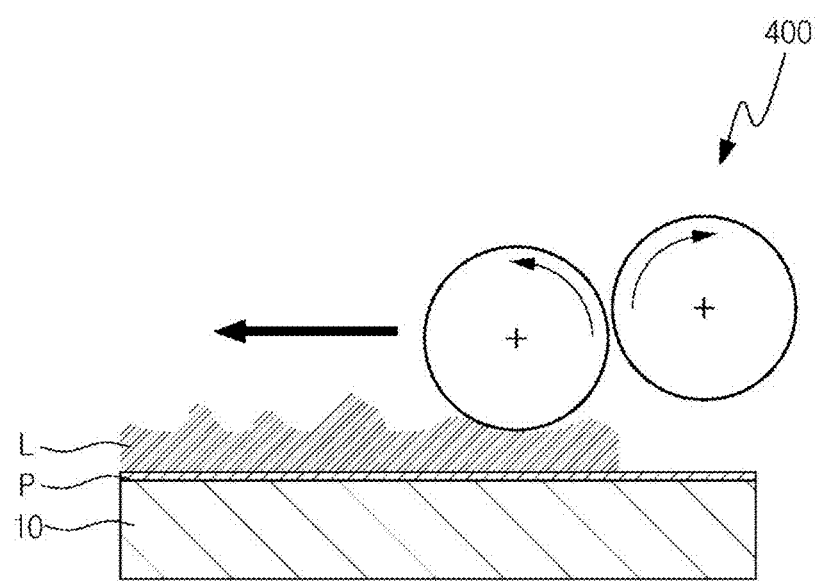
Figure 18:
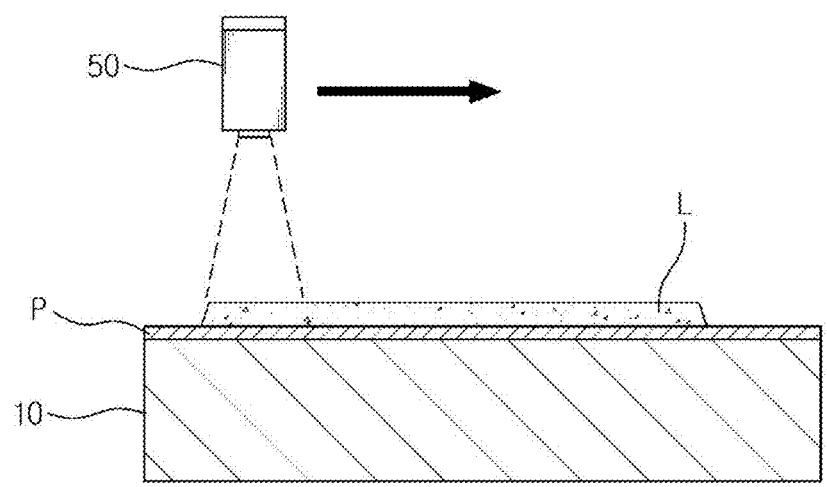

Next, as in FIG. 17, after flattening the layer L using the flattening unit 40 to a preset thickness, as in FIG. 18, the at least one deposited layer is cured using the curing unit 50.

Here, the controller 70 may analyze the camera 61 of the inspection unit (60 of FIG. 9) and an image received from the vibration sensor 62 and a vibration signal, to check the defect, curling and shrinkage and the like of the layer in real time, and perform correction on the layer through a predetermined correction algorithm when necessary.

Figure 19:
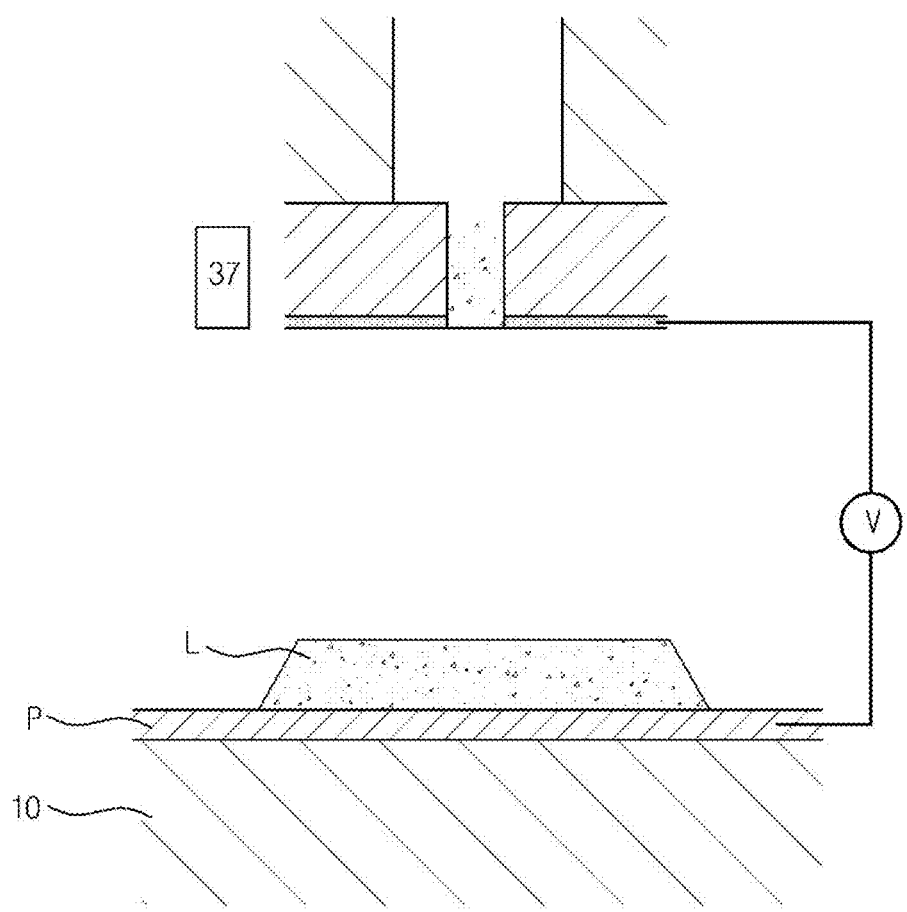

Next, as in FIG. 19, using a neutralization unit 37 equipped as a ion beam and the like, the electric field formed between the nozzle 32 and the substrate P is neutralized. At least one layer is formed in such a method, and by repeating at least one time in the order stored in the controller 70, a plurality of layers may be formed to additive-form an object.

Meanwhile, the neutralizing step using the neutralization unit 37 may be performed before, between, or after the flattening step or the curing step, or may be performed simultaneously with either one if necessary.

Figure 20:
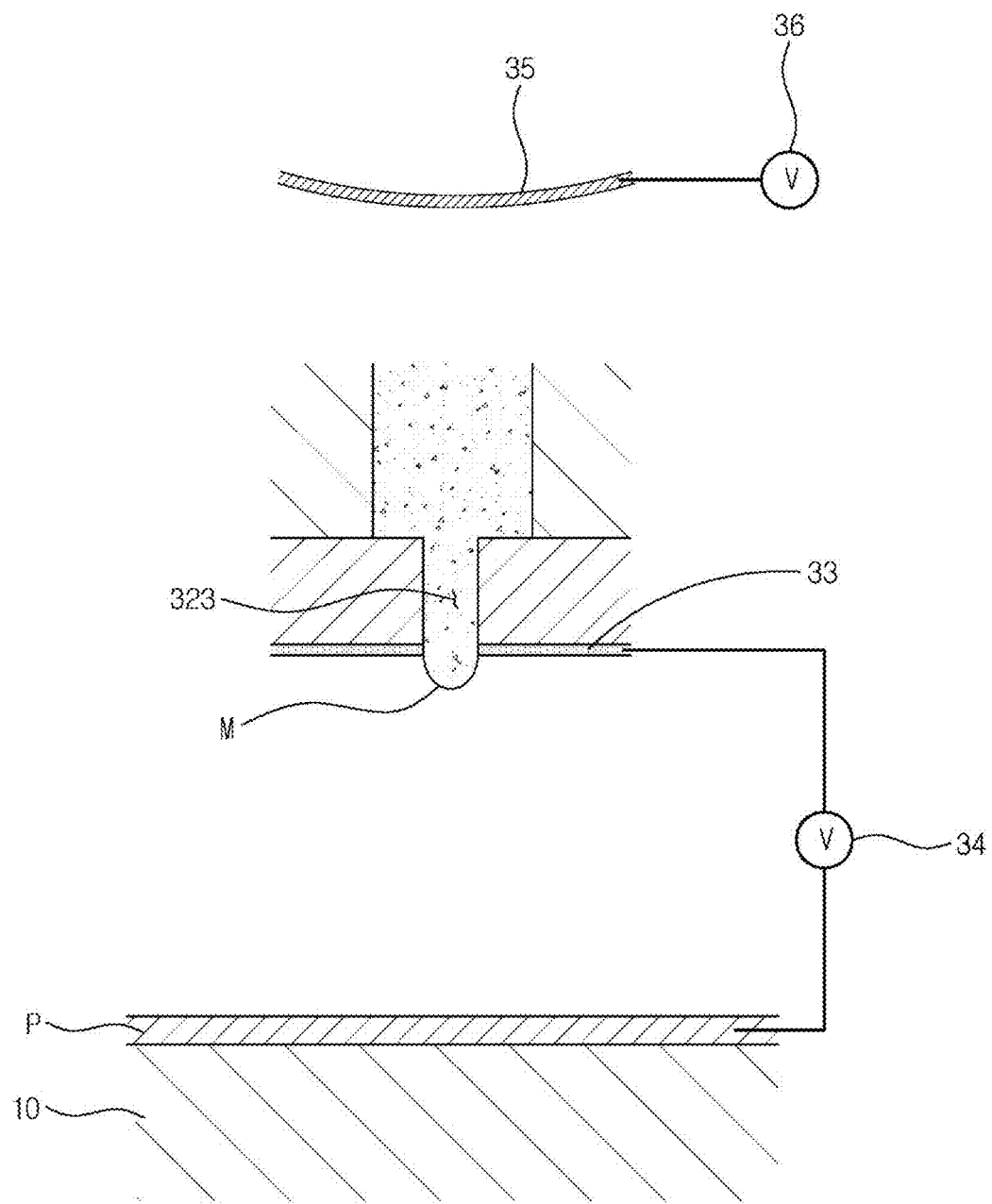
Figure 21:
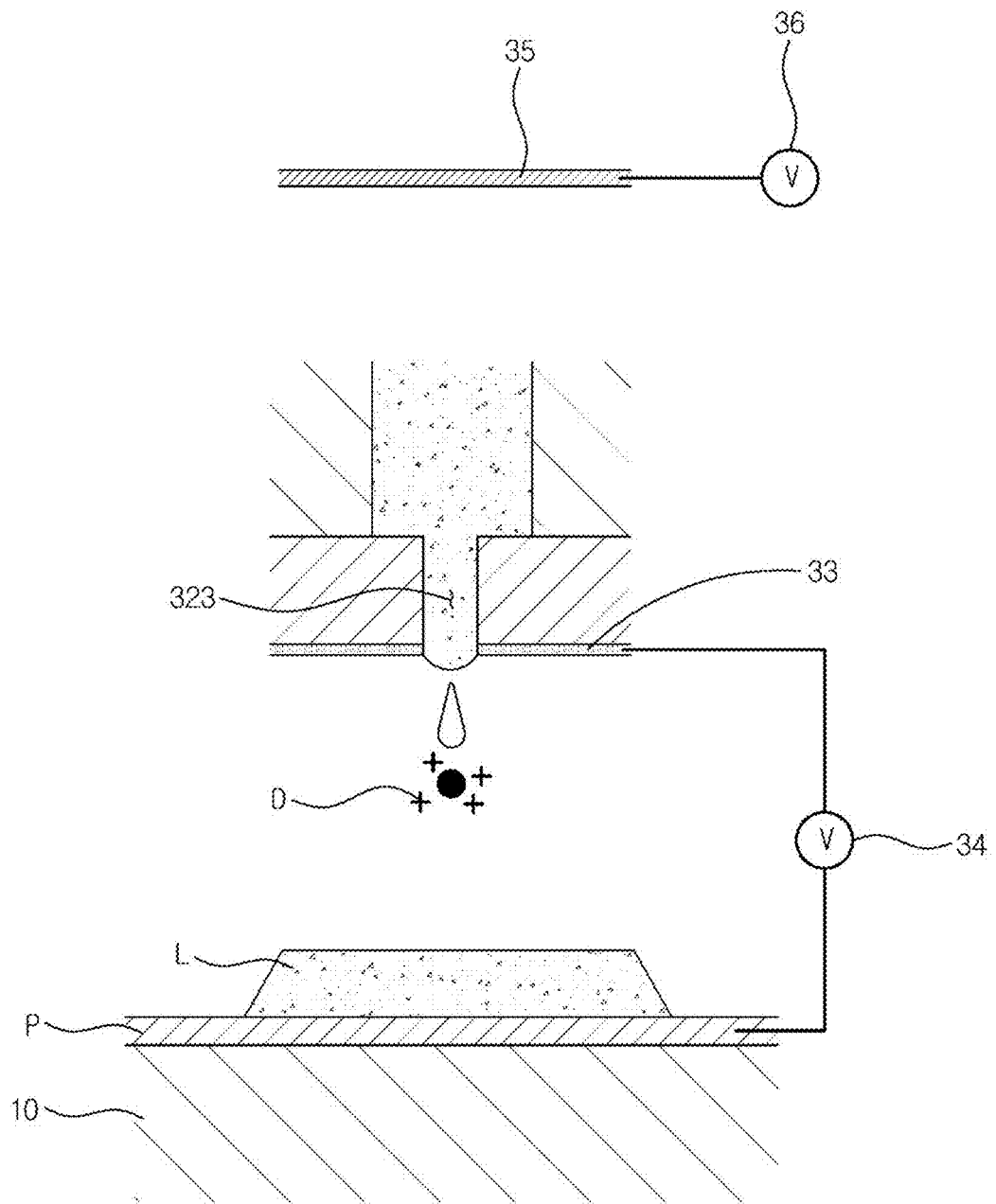

Next, as another example of the method of forming the above-described layer, as shown in FIG. 20, a meniscus is formed at the nozzle by applying a voltage through a voltage controller for piezo to generate a pressure wave into the chamber. Then, as in FIG. 21, it is possible to form an electric field between the printing platform and the substrate by applying a voltage through the voltage controller for electrode, an electric field can be formed between the printing platform and the substrate, and droplets can be discharged from the nozzle.

The right of scope of the present disclosure is not limited to the aforementioned embodiments, but may be implemented in various forms of embodiments within the attached claims set. Without departing from the gist of the present disclosure claimed in the claims set, it is considered to be within the scope of the claims of the present disclosure to various extents that can be modified by any person skilled in the art to which the present disclosure pertains.

REFERENCE NUMERALS

10: BUILD PLATFORM
20: GANTRY UNIT
21: Y RAIL
211: CARRIAGE
22: X RAIL
23: PLATEN GANTRY
30: PRINTING PLATFORM
31: CONTAINER
311: CONSUMABLE FLUID MATERIAL
312: HEATER
32: NOZZLE
32A: CHANNEL
321: INLET
322: CHAMBER
323: DISCHARGE END
33: ELECTRODE
34: VOLTAGE CONTROLLER FOR ELECTRODE
35: PIEZO DRIVER
36: VOLTAGE CONTROLLER FOR PIEZO ACTUATOR
40: FLATTENING UNIT
41: FIRST ROLLER
42: SECOND ROLLER
50: CURING UNIT
60: INSPECTION UNIT
61: CAMERA
62: VIBRATION SENSOR
70: CONTROLLER
71: ANALYZER
100: WORKING AREA
110, 120: ANY ONE LAYER
111: STRUCTURE
200: MANUFACTURED PRODUCT
300: DEVICE

What is claimed is:

1. An additive manufacturing system comprising:
a printing platform configured to spray a droplet and deposit the droplet on a substrate or a build platform by attractive-force control of an electric field to form at least one layer of a laminated body in a layer by layer method;
a flattening unit configured to flatten the laminated body formed by the printing platform to a preset height;
a curing unit configured to cure the laminated body flattened by the flattening unit; and
a controller configured to control the printing platform, the flattening unit and the curing unit,
wherein the printing platform comprises:
at least one nozzle equipped to discharge printing material;
an electrode formed on an outer area of a discharge end of the nozzle; and
a voltage controller for electrode, that is connected to a power supply to form an electric field between the electrode and one of a laminated body on the build platform, the substrate, and the build platform, and to discharge a charged droplet from the nozzle through voltage control to deposit the droplet on the build platform along the electric field, wherein the controller comprises:
a spatial distribution calculation unit configured to analyze spatial distribution of the electric field formed in a space between the nozzle, the laminated body being manufactured and the build platform; and
a trajectory calculation unit configured to estimate a trajectory where the charged droplet flies along the electric field after being discharged from the nozzle, and
wherein the controller is configured to control a voltage magnitude or pulse signal being supplied to each nozzle such that the droplet is deposited on a target point along the estimated trajectory or moving the nozzle such that the droplet is deposited on the target point along the estimated trajectory.

2. The additive manufacturing system according to claim 1, further comprising a charge neutralization unit configured to neutralize the electric field after at least one layer is formed by the printing platform.

3. The additive manufacturing system according to claim 2, wherein the neutralization unit is an ion generator.

4. The additive manufacturing system according to claim 1, wherein the print platform further comprises:

a piezo actuator installed to generate a pressure wave and pressurize the material of a chamber towards the discharge end; and
a voltage controller for the piezo actuator for drive control of the piezo actuator.

5. The additive manufacturing system according to claim 1, wherein the controller further comprises:
a database configured to accumulate spatial distribution data of the electric field formed between the nozzle, the laminated body being manufactured, and the build platform according to printing environment and additive material, and trajectory data that indicates a trajectory where the charged droplet flies under the electric field after being discharged from the nozzle; and
a printing algorithm configured to analyze a depositing point of the droplet through machine learning of the spatial distribution data and the trajectory data accumulated in the database.

6. The additive manufacturing system according to claim 1, wherein the curing unit is configured as a UV LED.

7. The additive manufacturing system according to claim 1, wherein the printing platform further comprises a gantry unit configured to move the printing platform in an x direction, y direction, and z direction on the build platform.

8. The additive manufacturing system according to claim 1, wherein the at least one nozzle is grouped into two groups, and
a first group is configured to spray droplets of 3 pL or less, and a second group is configured to spray droplets of 50 pL or more.

9. The additive manufacturing system according to claim 8, wherein the first group is controlled through a vector scan, and the second group is controlled through a raster scan.

10. The additive manufacturing system according to claim 8, wherein the first group is configured to perform additive manufacturing at an edge area of the laminated body, and the second group is configured to perform additive manufacturing at an inner area of the edge area.

11. The additive manufacturing system according to claim 10, wherein the first group is a single nozzle, and the second group is multiple nozzles.

12. An additive manufacturing system comprising:
a printing platform configured to spray a droplet and deposit the droplet on a substrate or a build platform by attractive-force control of an electric field to form at least one layer of a laminated body in a layer by layer method;
a flattening unit configured to flatten the laminated body formed by the printing platform to a preset height;
a curing unit configured to cure the laminated body flattened by the flattening unit; and
a controller configured to control the printing platform, the flattening unit and the curing unit,
wherein the flattening unit is configured as a pair of rollers of which each rotates about a center axis, and the pair of rollers is disposed to contact each other and is configured to move in a same direction by the controller, and
wherein one of the pair of rollers is a hydrophobic roller, and the other is a receptor roller configured to receive and remove material smeared on the hydrophobic roller.

13. The additive manufacturing system according to claim 12, wherein the receptor roller is installed so as not to contact the material deposited on the substrate.

14. The additive manufacturing system according to claim 12,
wherein the additive manufacturing system further comprises an inspection unit and the inspection unit comprises a camera configured to photograph a surface image of the hydrophobic roller and a vibration sensor configured to measure a vibration of the hydrophobic roller, and
the controller is configured to analyze an image obtained from the camera and a vibration pattern obtained from the vibration sensor to inspect whether or not a laminate state of the laminated body formed by the printing platform is abnormal.

15. An additive manufacturing method of an object by spraying a droplet and depositing the droplet by attractive-force control of an electric field in a layer by layer method, comprising:
a layer forming step that controls a voltage such that the droplet is discharged from a nozzle of a printing platform and the discharged droplet flies along the electric field and is deposited on a substrate, thereby forming at least one layer of a laminated body;
a flattening step that flattens the layer to a preset height by controlling a flattening unit; and
a curing step that cures the layer flattened by the flattening unit by controlling a curing unit,
wherein the layer forming step, the flattening step, and the curing step are controlled by a controller,
wherein the printing platform comprises:
at least one nozzle equipped to discharge printing material;
an electrode formed on an outer area of a discharge end of the nozzle; and
a voltage controller for electrode, that is connected to a power supply to form an electric field between the electrode and one of a laminated body on the build platform, the substrate, and the build platform, and to discharge a charged droplet from the nozzle through voltage control to deposit the droplet on the build platform along the electric field, wherein the controller comprises:
a spatial distribution calculation unit configured to analyze spatial distribution of the electric field formed in a space between the nozzle, the laminated body being manufactured and the build platform; and
a trajectory calculation unit configured to estimate a trajectory where the charged droplet flies along the electric field after being discharged from the nozzle, and
wherein the controller is configured to control a voltage magnitude or pulse signal being supplied to each nozzle such that the droplet is deposited on a target point along the estimated trajectory or moving the nozzle such that the droplet is deposited on the target point along the estimated trajectory.

16. The additive manufacturing method of an object according to claim 15, wherein the layer forming step comprises:
forming the electric field between the printing platform and the substrate, and applying a voltage through a voltage controller for an electrode such that a meniscus is formed on the nozzle of the printing platform; and
controlling a voltage of a piezo actuator such that a pressure wave is applied to a chamber of an upper portion of the nozzle to discharge the droplet from the nozzle.

17. The additive manufacturing method of an object according to claim 15, wherein the layer forming step comprises:

applying a voltage through a voltage controller for a piezo actuator such that a pressure wave is applied to a chamber of an upper portion of the nozzle to form a meniscus on the nozzle of the printing platform; and forming the electric field between the printing platform and the substrate, and controlling a voltage of a voltage controller for an electrode such that the droplet is discharged from the nozzle.

18. The additive manufacturing method of an object according to claim 15, further comprising neutralizing the electric field between the printing platform and the substrate, which is performed between the layer forming step, the flattening step, and the curing step, or simultaneously with any of them.

19. An additive manufacturing method of an object by spraying a droplet and depositing the droplet by attractive-force control of an electric field in a layer by layer method, comprising:

a layer forming step that controls a voltage such that the droplet is discharged from a nozzle of a printing platform and the discharged droplet flies along the electric field and is deposited on a substrate, thereby forming at least one layer of a laminated body;

a flattening step that flattens the layer to a preset height by controlling a flattening unit; and a curing step that cures the layer flattened by the flattening unit by controlling a curing unit, wherein the layer forming step, the flattening step, and the curing step are controlled by a controller, wherein the flattening unit is configured as a pair of rollers of which each rotates about a center axis, and the pair of rollers is disposed to contact each other and is configured to move in a same direction by the controller, and wherein one of the pair of rollers is a hydrophobic roller, and the other is a receptor roller, and during the flattening step, the receptor roller receives and removes material smeared on the hydrophobic roller.

\* \* \* \* \*